Dec. 19, 1967 W. SCHÄFFLER 3,358,531
BORING BAR
Filed March 14, 1966
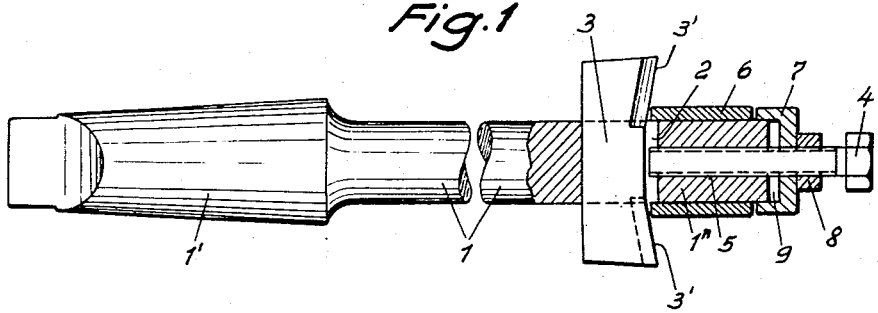
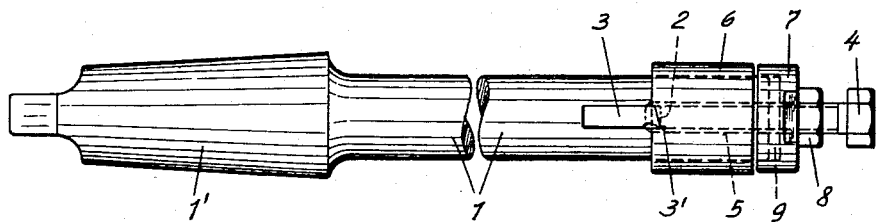
Willi Schäffler
INVENTOR.
BY Karl J. Ross
Attorney

# United States Patent Office 3,358,531
Patented Dec. 19, 1967

3,358,531
BORING BAR
Willi Schäffler, 49 Ulmenweg, 8400 Winterthur,
Zurich, Switzerland
Filed Mar. 14, 1966, Ser. No. 534,056
Claims priority, application Switzerland, Apr. 8, 1965,
5,062/65
3 Claims. (Cl. 77—58)

This invention relates to a boring bar having an exchangeable boring cutter for boring drilled holes, in which bar the boring cutter passing through an axial slot of the boring bar can be drawn tight by a stop-screw introduced through an axial threaded hole in the boring bar, while a guide bush corresponding to the diameter of the drilled holes is carried on the part of the boring bar lying before the boring cutter, the latter having teeth ground-back obliquely inwards and describing a conical cutting surface projecting forwards over the rear end of the guide bush, so that the guiding ensured by the guide bush continues to be maintained until the cutter has broken through the bore.

The accompanying drawing shows by way of example one preferred form of embodiment of the object of the invention.

FIG. 1 is a view of the boring bar, partly in axial section, and

FIG. 2 is a top view to FIG. 1.

Referring to said annexed drawing, a boring bar 1, provided with a taper clamping shaft 1', has a slot 2 extending in its front part in the axial plane and having an exchangeable boring, cutter 3 inserted therein. The cutter 3 is fixed in position by a stop-screw 4 which is screwed from the front into a coaxial threaded hole 5 in the boring bar 1. The part 1" of the boring bar lying before the boring cutter 3 has a guide bush 6 rotatably supported thereon. The axial clearance of the guide bush 6 is defined by an adjusting nut 7 with counternut 8, arranged on stop-screw 4. The adjusting nut 7 has, on its face turned towards the front end of the boring bar 1, a cylindrical turned recess 9, into which the front end of the boring bar 1 can fit. The external diameter of the adjusting nut 7 is somewhat smaller than that of the guide bush 6. This prevents the adjusting nut 7 from engaging the inner wall of the drilled hole.

In the illustrated case, the boring cutter 3 has teeth 3' ground back obliquely inwards and describing a conical cut surface projecting to the front over the rear part of the guide bush 6, so that the guiding ensured by the guide bush 6 in the drilled hole is maintained until the cutter breaks through the hole. The part of the boring bar lying behind the boring cutter is smaller in diameter than the external diameter of the guide bush 6 seated on the boring bar before the cutter. In this way, between the boring bar and the sides of the bore behind the boring cutter, a space is formed which is large enough to avoid formation of an obstruction when clearing away the chips created by the boring.

What I claim is:

1. A boring bar with exchangeable boring cutter for boring drilled holes, characterized in that in this bar the boring cutter passing through an axial slot of the boring bar can be drawn tight by a stop-screw introduced through an axial threaded hole in the boring bar, while a guide bush corresponding to the diameter of the drilled hole is carried on the part of the boring bar lying before the boring cutter, the latter having teeth ground-back obliquely inwards and describing a conical cutting surface projecting forwards over the rear end of the guide bush, so that guiding ensured by the guide bush continues to be maintained until the cutter has broken through the bore.

2. A boring bar as defined in claim 1, wherein the axial clearance of the guide bush can be defined by an adjusting nut with counternut, settable on the thread of the stop-screw.

3. A boring bar as defined in claim 1, wherein the part of the boring bar lying behind the boring cutter is smaller in diameter than the external diameter of the guide bush carried on the boring bar before the cutter, sufficient room being thus provided for the removal of chips.

References Cited
UNITED STATES PATENTS

| | | | |
|---|---|---|---|
| 289,522 | 12/1883 | Faught | 77—58 |
| 1,131,871 | 3/1915 | Spoehr | 77—58 |
| 2,469,543 | 5/1949 | Bondhus | 77—58 |

GERALD A. DOST, *Primary Examiner.*